United States Patent
Kei (10) Patent No.: US 11,506,880 B2
(45) Date of Patent: Nov. 22, 2022

(54) OPTICAL ILLUMINATION DEVICE

(71) Applicant: Yokogawa Electric Corporation, Tokyo (JP)

(72) Inventor: Takayuki Kei, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 125 days.

(21) Appl. No.: 17/041,284

(22) PCT Filed: Feb. 21, 2019

(86) PCT No.: PCT/JP2019/006577
§ 371 (c)(1),
(2) Date: Sep. 24, 2020

(87) PCT Pub. No.: WO2019/187832
PCT Pub. Date: Oct. 3, 2019

(65) Prior Publication Data
US 2021/0109335 A1    Apr. 15, 2021

(30) Foreign Application Priority Data
Mar. 28, 2018  (JP) .............................. JP2018-061196

(51) Int. Cl.
G02B 21/08   (2006.01)
G02B 3/00    (2006.01)
G02B 7/02    (2021.01)
G02B 27/09   (2006.01)
(Continued)

(52) U.S. Cl.
CPC .......... *G02B 21/08* (2013.01); *G02B 3/0062* (2013.01); *G02B 7/021* (2013.01); *G02B 27/0927* (2013.01); *G02B 27/48* (2013.01); *H01S 3/005* (2013.01)

(58) Field of Classification Search
None
See application file for complete search history.

(56) References Cited

U.S. PATENT DOCUMENTS 6,081,381 A *  6/2000  Shalapenok ........... G02B 26/06
                                                         359/620
8,148,663 B2   4/2012  Adams et al.
(Continued)

FOREIGN PATENT DOCUMENTS

EP    1359452 A1    11/2003
JP    11-64789 A     3/1999
(Continued)

OTHER PUBLICATIONS

Voelkel et al., "Laser Beam Homogenizing: Limitations and Constraints", SPIE Europe Optical Systems Design, Sep. 2-5, 2008, total 12 pages; Cited in Specification.

Primary Examiner — Bao-Luan Q Le
Assistant Examiner — Danell L Owens
(74) Attorney, Agent, or Firm — Rankin, Hill & Clark LLP (57) ABSTRACT

An optical illumination device (10) includes: a laser light source (1); microlens arrays (2, 3) through which light emitted from the laser light source (1) passes; a moving mechanism (5) that moves the microlens arrays (2, 3) without changing an optical length from the laser light source (1); and a Fourier lens (4) through which light passing through the microlens arrays (2, 3) passes.

14 Claims, 4 Drawing Sheets

(51) Int. Cl.
*H01S 3/00* (2006.01)
*G02B 27/48* (2006.01)

(56) References Cited

U.S. PATENT DOCUMENTS

| | | | |
|---|---|---|---|
| 2005/0094261 A1* | 5/2005 | Hell | G02B 21/0032 |
| | | | 359/227 |
| 2008/0165401 A1 | 7/2008 | Kasazumi | |
| 2012/0281258 A1* | 11/2012 | Sheblee | G02B 21/0072 |
| | | | 358/474 |
| 2015/0378141 A1 | 12/2015 | Bathe et al. | |
| 2016/0161728 A1 | 6/2016 | Sangu | |

FOREIGN PATENT DOCUMENTS

| | | | | |
|---|---|---|---|---|
| JP | 11064789 A | * | 3/1999 | ............ G02B 27/48 |
| JP | 2016-509692 A | | 3/2016 | |
| JP | 2016-110056 A | | 6/2016 | |
| JP | 2019-27893 A | | 2/2019 | |
| WO | 2009/087396 A1 | | 7/2009 | |

* cited by examiner

OPTICAL ILLUMINATION DEVICE

TECHNICAL FIELD

The present invention relates to an optical illumination device.

Priority is claimed on Japanese Patent Application No. 2018-061196, filed Mar. 28, 2018, the content of which is incorporated herein by reference.

BACKGROUND ART

For example, an optical illumination device is used for laser equipment such as a laser microscope, laser machining equipment, or semiconductor exposure equipment. An optical illumination device includes, for example, a laser light source and a lens. The optical illumination device irradiates a sample such as cells with light emitted from the lens via a microscopic optical system. When cells are labeled with a fluorescent material in advance, fluorescence is emitted from the cells. By acquiring an image of the fluorescence using the microscopic optical system, observation of cells, analysis of behavior of the cells, and the like can be performed.

In the optical illumination device, a broad area including a sample is irradiated with light from the laser light source. Since the laser light source is a point light source, the light intensity is likely to have a Gaussian shape, that is, a distribution in which the center is intensive and the periphery is weak. In an image which is acquired using laser light having an intensity distribution with a Gaussian shape, the central region is bright and the peripheral region is dark. In this case, since there is a problem that analysis accuracy is affected, or the like, there is demand for improvement therein.

The devices described in Patent Literature 1 and Non Patent Literature 1, a Koehler illumination system including a microlens array and a Fourier lens is used. Laser light has characteristics of interference (coherence). According, when a repeated pattern such as a microlens is present in an optical path, interference or diffraction may occur or speckles may be formed accordingly. In this case, a pattern of interference fringes or the like appear in illumination light and the homogeneity thereof is degraded.

Figure 6:
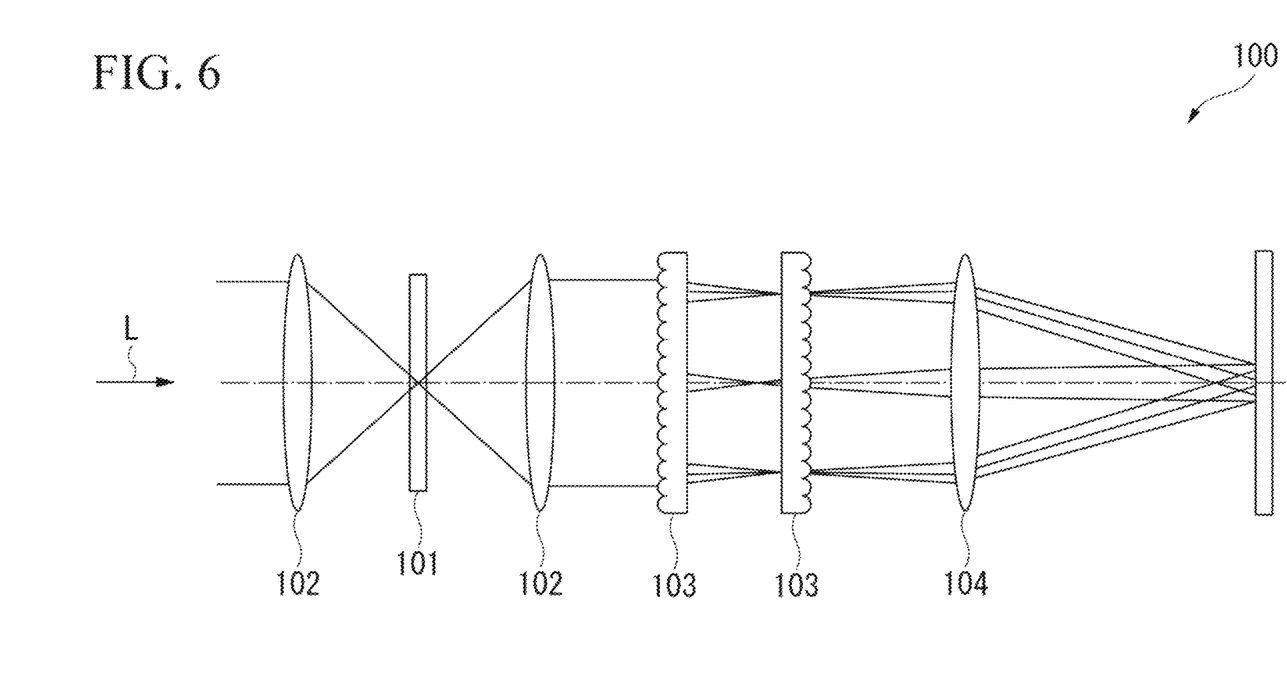
FIG. 6 is a diagram illustrating a configuration of a device according to the related art.

In such devices, in order to disrupt the coherence of laser light and to decrease an influence of interference or diffraction to enhance the homogeneity of illumination light, a diffuser (a diffusing film) may be provided in an optical path. FIG. 6 is a diagram illustrating an example of a configuration of such a device. The device 100 includes a laser light source (not illustrated) that emits laser light L, a diffuser 101, a relay lens 102 that assembles the diffuser 101 in an optical path, a microlens array 103, and a Fourier lens 104. A device having such a configuration is also referred to as a homogenizer.

CITATION LIST

Patent Literature

[Patent Literature 1]
U.S. Pat. No. 8,148,663

Non Patent Literature

[Non Patent Literature 1]
Reinhard Voelkel, et al., "Laser Beam Homogenizing: Limitations and Constraints" SPIE Europe. 2-5 Sep. 2008.

SUMMARY OF INVENTION

Technical Problem

In the device 100, two structures, that is, a structure for disrupting the coherence of laser light (the diffuser 101 and the relay lens 102) and a structure for realizing homogeneity of laser light (the microlens array 103 and the Fourier lens 104), are provided along an optical path. Accordingly, the optical path is elongated and the size of the device is increased. Since the device 100 includes many elements, the costs thereof may be high.

An aspect of the invention provides an optical illumination device that can achieve a decrease in size and a decrease in costs.

Solution to Problem

One aspect of the present application provides an optical illumination device including: a laser light source; one or more microlens arrays through which light emitted from the laser light source passes; a moving mechanism that moves the microlens array without changing an optical length from the laser light source; and a Fourier lens through which light passing through the microlens array passes.

With this configuration, it is possible to decrease an influence of interference and diffraction by homogenizing laser light through movement of the microlens array. Accordingly, illumination light becomes homogeneous light. With this configuration, the microlens array and the Fourier lens provide both a function of homogenizing laser light and a function of disrupting the coherence of laser light. Accordingly, it is not necessary to use a diffuser (a diffusing film). As a result, it is possible to simplify a device configuration and to achieve a decrease in size and a decrease in costs.

The optical illumination device may have a configuration wherein the microlens array rotates around an axis which is perpendicular to the microlens array, and wherein the moving mechanism causes the microlens array to rotate around the axis.

With this configuration, since the microlens array is configured to rotate around an axis, it is possible to decrease an influence of interference of laser light with a simple structure. Accordingly, it is possible to achieve a decrease in size and a decrease in costs, which is advantageous.

The microlens array may include a plurality of lenses that are arranged in a spiral shape.

With this configuration, since the lens is arranged in a spiral shape, the position in the radial direction of the lens changes in the course of rotation of the microlens array. Accordingly, it is possible to decrease an influence of interference of laser light.

The plurality of microlens arrays may include a first microlens array and a second microlens array which are disposed to face each other. A relative position between the first microlens array and the second microlens array may be fixed.

With this configuration, laser light passing through a lens of the first microlens array passes through a corresponding specific lens of the second microlens array. Accordingly, it is possible to obtain stable optical characteristics.

The optical illumination device may further include a connection portion that connects the first microlens array and the second microlens array to each other. The first microlens array and the second microlens array may be able to rotate integrally.

With this configuration, the relative position between the lenses of the first microlens array and the lenses of the second microlens array is fixed with high accuracy. Accordingly, it is possible to obtain more stable optical characteristics.

The microlens array may be disposed to be perpendicular to a direction of light which is emitted from the laser light source.

The microlens array may have a disc shape. The plurality of lenses may be displaced from each other in position in a radial direction of the microlens array and are displaced from each other in position in a circumferential direction of the microlens array.

An amount of displacement in the radial direction and an amount of displacement in the circumferential direction of neighboring lenses out of the plurality of lenses may be fixed.

The first microlens array and the second microlens array may have a disc shape. The first microlens array and the second microlens array may be able to rotate integrally around the same axis.

The plurality of microlens arrays may include a first microlens array and a second microlens array which are disposed to face each other. The first microlens array may include a plurality of first lenses that are arranged in a spiral shape. The second microlens array may include a plurality of second lenses that are arranged in a spiral shape.

The first microlens array and the second microlens array may have a disc shape. The plurality of first lenses may be displaced from each other in position in a radial direction of the first microlens array and be displaced from each other in position in a circumferential direction of the first microlens array. The plurality of second lenses may be displaced from each other in position in a radial direction of the second microlens array and be displaced from each other in position in a circumferential direction of the second microlens array.

An amount of displacement in the radial direction and an amount of displacement in the circumferential direction of neighboring lenses out of the plurality of first lenses and an amount of displacement in the radial direction and an amount of displacement in the circumferential direction of neighboring lenses out of the plurality of second lenses may be the same.

Arrangement of the plurality of second lenses of the second microlens array when seen in a thickness direction thereof may correspond to arrangement of the plurality of first lenses in a one-to-one manner.

A relative position between one lens out of the plurality of first lenses and one lens corresponding thereto out of the plurality of second lenses may be fixed.

The plurality of first lenses may split the light emitted from the laser light source into a plurality of light beams. The plurality of second lenses may condense the plurality of light beams output from the plurality of first lenses.

With this configuration, it is possible to simplify a device configuration and to achieve a decrease in size and a decrease in costs.

Advantageous Effects of Invention

According to the aspects of the invention, it is possible to achieve a decrease in size and a decrease in costs.

DESCRIPTION OF EMBODIMENTS

Hereinafter, embodiments of the invention will be described with reference to the accompanying drawings.

First Embodiment (Optical Illumination Device)

Figure 1:
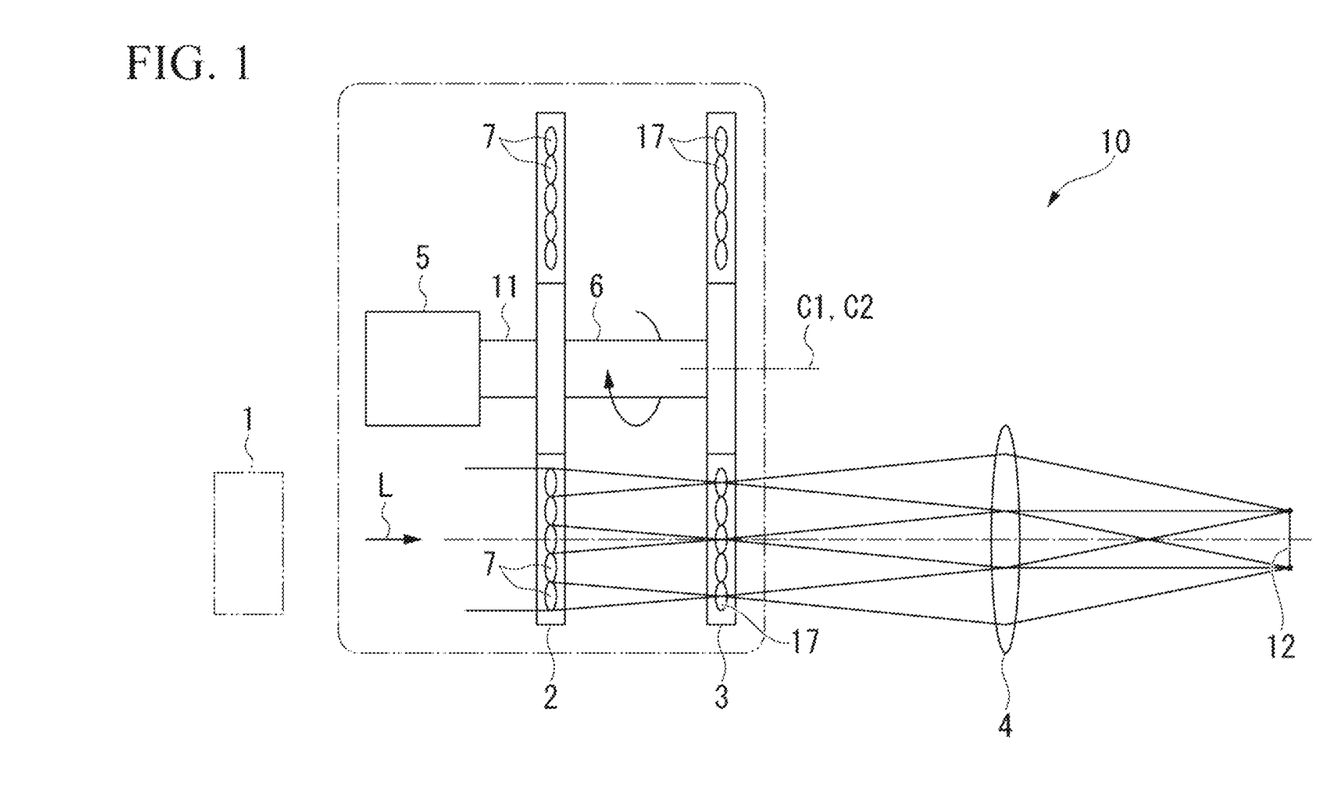
FIG. 1 is a diagram illustrating a configuration of an optical illumination device according to a first embodiment.

FIG. 1 is a diagram illustrating a configuration of an optical illumination device 10 according to a first embodiment.

As illustrated in FIG. 1, the optical illumination device 10 includes a laser light source 1, a first microlens array 2 (a first microlens array), a second microlens array 3 (a second microlens array), a Fourier lens 4, a rotational moving mechanism 5, and a connection portion 6.

The laser light source 1 includes a laser oscillator (not illustrated) such as a semiconductor laser or a solid laser. In FIG. 1, the laser light source 1 is drawn to be close to the first microlens array 2, but the laser light source 1 is conceptually a point light source which is located infinitely distant from the first microlens array 2.

The first microlens array 2 is formed in a disc shape in which a plurality of lenses 7 (microlenses) are arranged. The first microlens array 2 can rotate around an axis C1. The axis C1 is perpendicular to a disc plane of the first microlens array 2. The axis C1 is parallel to a thickness direction of the first microlens array 2. The first microlens array 2 can rotate without changing an optical length from the laser light source 1 to the first microlens array 2. The disc plane of the first microlens array 2 is disposed to be perpendicular to a direction of laser light L which is emitted from the laser light source 1.

Each of a plurality of lenses 7 has a function of condensing laser light L from the laser light source 1. The first microlens array 2 includes a plurality of lenses 7 (first lenses) and thus splits incident laser light L into a plurality of light beams. The first microlens array 2 has a function of a field stop and defines an irradiation area of a target plane 12 with laser light L.

Figure 2:
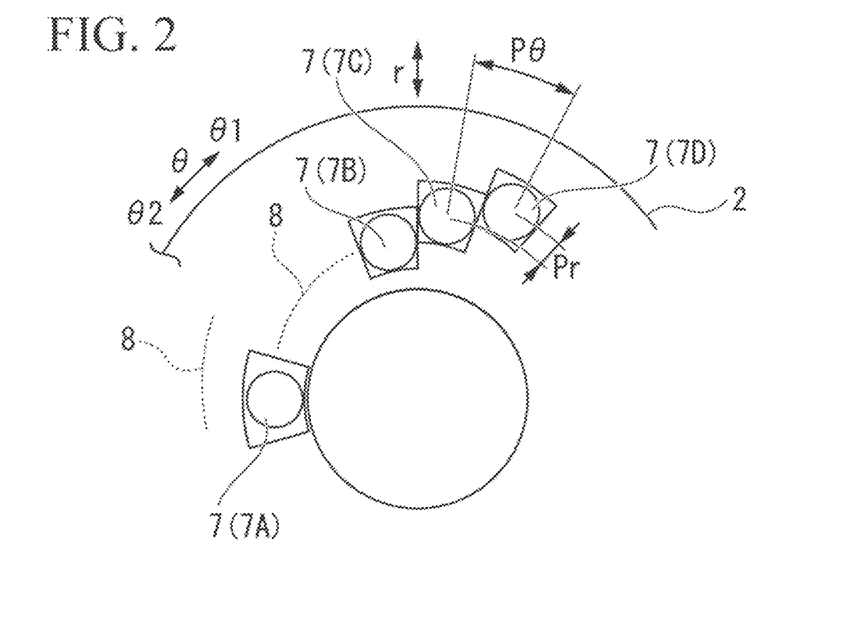
FIG. 2 is a diagram illustrating an arrangement of lenses of a microlens array of the optical illumination device illustrated in FIG. 1.

FIG. 2 is a diagram illustrating arrangement of the lenses 7 of the first microlens array 2. FIG. 2 is a schematic diagram when the first microlens array 2 is seen from the thickness direction thereof. Here, "r" denotes a radial direction of the first microlens array 2. "θ" denotes a circumferential direction of the first microlens array 2 (a direction around an axis C1). "θ1" denotes one direction of the circumferential direction θ and denotes a rotating direction of the first microlens array 2. "θ2" denotes a direction opposite to the rotating direction θ1.

The plurality of lenses 7 are arranged in a spiral shape (a helical shape) in multiple groups. Specifically, the plurality of lenses 7 constitute a plurality of lens lines 8. Each of the lens lines 8 includes a plurality of lenses 7 which are arranged in a line. The plurality of lenses 7 constituting each of the lens lines 8 (for example, lenses 7A to 7D) are arranged along the line (that is, from the lens 7A to the lens 7D) to be displaced outward in position in the radial direction r and to be displaced to a predetermined side (for example, the θ1 side) in position in the circumferential direction θ.

Pr in FIG. 2 denotes an amount of displacement in the radial direction r between neighboring lenses 7 and 7. The amount of displacement Pr may be a fixed value for the plurality of lenses 7. Pθ in FIG. 2 denotes an amount of displacement in the circumferential direction θ between neighboring lenses 7 and 7. The amount of displacement Pθ may be a fixed value for the plurality of lenses 7. The amount of displacement Pθ corresponds to one image plane of the lens 7. Since the plurality of lenses 7 constituting one lens line 8 are arranged with fixed amounts of displacement Pr and PO, the plurality of lenses 7 are arranged in a spiral shape. Since the plurality of lens lines 8 are provided at different positions in the circumferential direction θ, the plurality of lenses 7 are arranged in multiple groups.

As illustrated in FIG. 1, the second microlens array 3 is formed in a disc shape in which a plurality of lenses 17 (microlenses) (second lenses) are arranged. The second microlens array 3 can rotate around an axis C2. The axis C2 is perpendicular to a disc plane of the second microlens array 3. The axis C2 is parallel to a thickness direction of the second microlens array 3. The second microlens array 3 can rotate without changing an optical length from the laser light source 1 to the second microlens array 3. The disc plane of the second microlens array 3 is disposed to be perpendicular to the direction of laser light L.

Each of a plurality of lenses 17 has a function of condensing laser light L (the plurality of light beams output from the plurality of lenses 7). The second microlens array 3 has a function of an aperture stop.

The first microlens array 2 and the second microlens array 3 are disposed to be parallel to each other with a gap therebetween in the thickness direction. The first microlens array 2 and the second microlens array 3 are disposed to face each other. The first microlens array 2 and the second microlens array 3 may have the same outer diameter. The axis C1 of the first microlens array 2 and the axis C2 of the second microlens array 3 are aligned each other.

The plurality of lenses 17 are arranged in a spiral shape (a helical shape) in multiple groups similarly to the lenses 7 of the first microlens array 2 (see FIG. 2). Specifically, the plurality of lenses 17 constitute a plurality of lens lines when seen from the thickness direction of the second microlens array 3. The plurality of lenses 17 constituting each of the lens lines are arranged along the line to be displaced outward in position in the radial direction of the second microlens array 3 and to be displaced in position in the circumferential direction.

An amount of displacement in the radial direction between neighboring lenses 17 and 17 may be the same as the amount of displacement Pr in FIG. 2. An amount of displacement in the circumferential direction between neighboring lenses 17 and 17 may be the same as the amount of displacement Pθ in FIG. 2. The outer diameter of each lens 17 may be the same as the outer diameter of each lens 7 of the first microlens array 2. The number of lenses 17 may be the same as the number of lenses 7 of the first microlens array 2. Each lens 17 may be a lens having the same specifications as each lens 7 of the first microlens array 2 or may be a lens having specifications different from those of the lens 7.

A focal distance $f_{MLA}$ of the lenses 7 and 17 may be set to, for example, range from 10 mm to 20 mm. The outer diameter $D_{MLA}$ (a lens diameter) of the lenses 7 and 17 may be set to, for example, a range of from 0.3 mm to 0.8 mm. For example, 30 to 50 lenses 7 and 17 may be included in each light beam of laser light L.

Arrangement of the plurality of lenses 17 corresponds to arrangement of the lenses 7 of the first microlens array 2 (see FIG. 2) when seen from the thickness direction of the second microlens array 3. A relative position between one lens 7 and one lens 17 may be fixed. In this case, laser light L passing through one lens 7 passes through a corresponding specific lens 17 regardless of the position in the circumferential direction of the microlens arrays 2 and 3. Accordingly, it is possible to obtain stable optical characteristics.

The connection portion 6 connects a central portion of the first microlens array 2 to a central portion of the second microlens array 3. Accordingly, the first microlens array 2 and the second microlens array 3 can rotate integrally around the axes C1 and C2. As a result, the relative position between one lens 7 of the first microlens array 2 and one lens 17 of the second microlens array 3 corresponding to the one lens 7 is accurately fixed. Accordingly, since laser light L passing through one lens 7 passes through the corresponding specific lens 17, it is possible to obtain more stable optical characteristics.

The Fourier lens 4 can employ a known Fourier lens. The Fourier lens 4 can be used to integrate an image which is formed by laser light L passing through the microlens arrays 2 and 3. A focal distance $f_{FL}$ of the Fourier lens 4 may be set to, for example, range from 300 mm to 500 mm. The other diameter (a lens diameter) of the Fourier lens 4 may be set to, for example, a range of from 40 mm to 50 mm.

The first microlens array 2, the second microlens array 3, and the Fourier lens 4 constitute a Koehler illumination system.

The rotational moving mechanism 5 is connected to the first microlens array 2 via a rotation shaft 11. The rotational moving mechanism 5 is, for example, a motor. The rotational moving mechanism 5 causes the first microlens array 2 and the second microlens array 3 to rotate around the axes C1 and C2 via the rotation shaft 11.

(Irradiation Method with Laser Light)

An irradiation method with laser light L using the optical illumination device 10 will be described below with reference to FIG. 1.

Figure 3:
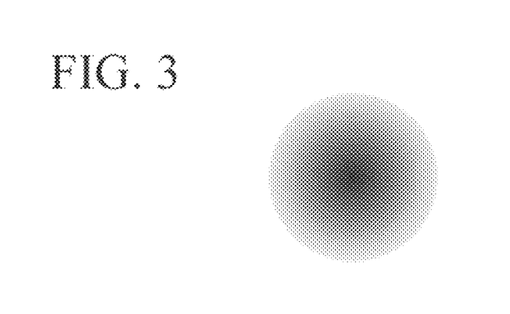
FIG. 3 is a diagram illustrating an intensity distribution of laser light which has been emitted form a laser light source.

FIG. 3 is a diagram illustrating an intensity distribution of laser light L which is emitted from the laser light source 1. As illustrated in FIG. 3, the intensity of laser light L has a Gaussian shape, that is, a distribution in which the central part is intensive and the peripheral part is weak.

Laser light L emitted from the laser light source 1 passes sequentially through the plurality of lenses 7 of the first microlens array 2 and the plurality of lenses 17 of the second microlens array 3. The laser light L additionally passes through the Fourier lens 4 and reaches the target plane 12.

At this time, the first microlens array 2 and the second microlens array 3 are caused to rotate around the axes C1 and C2 by the rotational moving mechanism 5. The microlens arrays 2 and 3 are connected to each other via the connection portion 6 and thus rotate integrally. The rotation speed of the microlens arrays 2 and 3 depends on the size of the microlens arrays 2 and 3 and is, for example, equal to or greater than 100 rpm (equal to or greater than 1000 rpm). The rotation speed of the microlens arrays 2 and 3 may range from 5000 rpm to 10,000 rpm.

Figure 4:
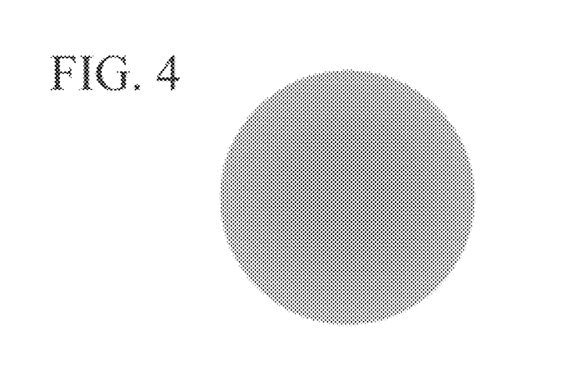
FIG. 4 is a diagram illustrating an intensity distribution of irradiation light.

In the laser light L, interference or diffraction may occur due to coherency and a repeated pattern of the lenses, but an influence of interference or the like can be decreased by homogenizing the light intensity with the rotation of the microlens arrays 2 and 3. Accordingly, irradiation light with which the target plane 12 is irradiated is homogeneous light with almost constant intensity over the entire area. FIG. 4 is a diagram illustrating an intensity distribution of irradiation light. As illustrated in FIG. 4, the light intensity is almost constant over the entire area.

When the first microlens array 2 and the second microlens array 3 do not rotate, interference or diffraction may occur due to coherency of laser light L and the repeated pattern of the lenses 7 and 17. Accordingly, there is a likelihood that interference fringes will be generated and homogeneous irradiation light will not be obtained.

The diameter DFP of irradiation light acquired from the target plane 12 is calculated, for example, by Expression (1).

$$DFP = D_{MLA} \cdot f_{FL} / f_{MLA} \tag{1}$$

In Expression (1), $D_{MLA}$ denotes the outer diameter (a lens diameter) of the lenses 7 and 17. $f_{FL}$ denotes a focal distance of the Fourier lens 4. $f_{MLA}$ denotes the focal distance of the lenses 7 and 17. For example, a field number of a general microscope is ϕ20 mm. In order to acquire irradiation light with a homogeneous distribution in this range, $f_{MLA}$=10 mm, $D_{MLA}$=0.5 mm, and $f_{FL}$=400 mm can be set.

In the optical illumination device 10 according to the first embodiment, an influence of interference or diffraction can be decreased by homogenizing the laser light L with the rotation of the microlens arrays 2 and 3. Accordingly, irradiation light with which the target plane 12 is irradiated is homogeneous light.

In the optical illumination device 10, the microlens arrays 2 and 3 and the Fourier lens 4 provide both a function of homogenizing laser light and a function of disrupting the coherence of laser light. Accordingly, it is not necessary to use a diffuser (a diffusing film). As a result, it is possible to simplify a device configuration and to achieve a decrease in size and a decrease in costs.

Irradiation light acquired in the optical illumination device 10 can be used as excitation light in a laser microscope. For example, a sample such as cells can be irradiated with the irradiation light using a microscopic optical system. When cells are labeled with a fluorescent material in advance, fluorescence is emitted from the cells. By acquiring an image of the fluorescence using the microscopic optical system, observation of cells, analysis of behavior of the cells, and the like can be performed. Since the irradiation light acquired in the optical illumination device 10 has a homogeneous distribution, it is possible to obtain an image with homogeneous brightness and to enhance analysis accuracy.

In the optical illumination device 10, since the microlens arrays 2 and 3 are configured to rotate around the axes C1 and C2, it is possible to decrease an influence of interference of laser light with a simple structure. Accordingly, it is possible to achieve a decrease in size and a decrease in costs, which is advantageous.

In the optical illumination device 10, since the plurality of lenses 7 and 17 constituting the microlens arrays 2 and 3 are arranged in a spiral shape (see FIG. 2), the positions in the radial direction of the plurality of lenses 7 and 17 constituting the lens lines change in the course of rotation of the microlens arrays 2 and 3. Accordingly, it is possible to decrease an influence of interference of laser light L.

Second Embodiment (Optical Illumination Device)

Figure 5:
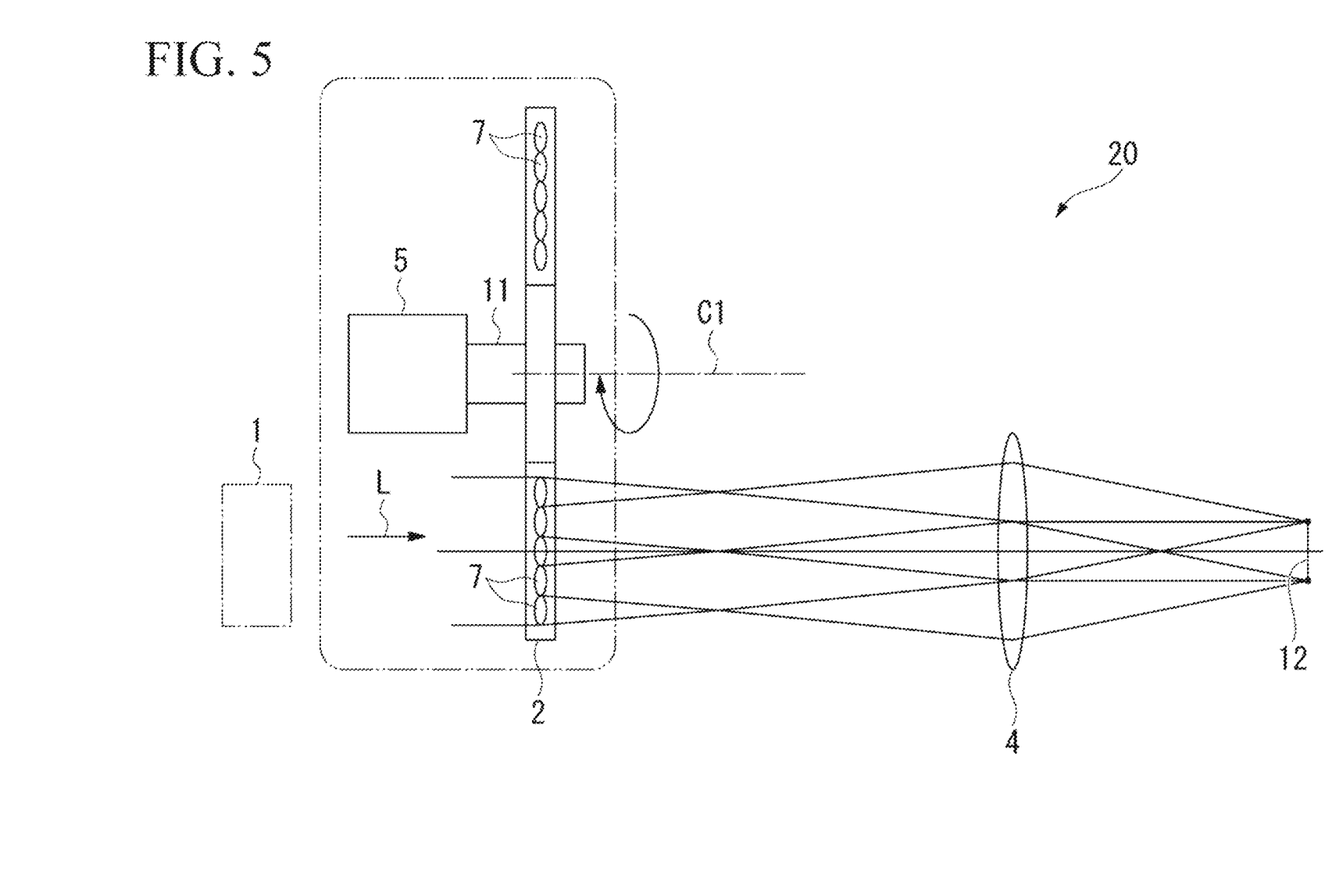
FIG. 5 is a diagram illustrating a configuration of an optical illumination device according to a second embodiment.

FIG. 5 is a diagram illustrating a configuration of an optical illumination device 20 according to a second embodiment. The same elements as those in the optical illumination device 10 according to the first embodiment illustrated in FIG. 1 will be referred to by the same reference signs and description thereof will be omitted.

As illustrated in FIG. 5, the optical illumination device 20 includes a laser light source 1, a first microlens array 2, a Fourier lens 4, a rotational moving mechanism 5, and a rotation shaft 11.

The optical illumination device 20 is different from the optical illumination device 10 illustrated in FIG. 1 in that the second microlens array 3 is not provided.

(Irradiation Method with Laser Light)

Laser light L emitted from the laser light source 1 passes through the lenses 7 of the first microlens array 2 and the Fourier lens 4 and reaches the target plane 12. At this time, the first microlens array 2 is caused to rotate around the axis C1 by the rotational moving mechanism 5.

In laser light L, interference or diffraction may occur due to coherency and a repeated pattern of the lenses 7, and an influence thereof can be decreased with the rotation of the first microlens array 2. Accordingly, irradiation light with which the target plane 12 is irradiated is homogeneous light with almost constant intensity over the entire area.

With the optical illumination device 20, since homogenous irradiation light is acquired without using a diffuser (a diffusing film), it is possible to simplify a device configuration and to achieve a decrease in size and a decrease in costs.

With the optical illumination device 20, since the number of microlens arrays is small, it is possible to further simplify a device configuration and to advantageously achieve a decrease in size and a decrease in costs, in comparison with the optical illumination device 10 illustrated in FIG. 1.

The invention is not limited to the above embodiments and can be modified in various forms without departing from the gist of the invention. For example, in the above embodiments, the microlens arras 2 and 3 rotate around the axes C1 and C2, but movement of the microlens array is not limited to rotation. For example, the microlens array may be made to translate in an in-plane direction of the microlens array without changing an optical length from the laser light source to the microlens array. The number of microlens arrays may be equal to or greater than three.

REFERENCE SIGNS LIST

1 Laser light source
2 First microlens array
3 Second microlens array
4 Fourier lens
5 Rotational moving mechanism (moving mechanism)
6 Connection portion
7 Lens (first lens)
17 Lens (second lens)
10, 20 Optical illumination device

The invention claimed is:
1. An optical illumination device comprising:
a laser light source;

a plurality of microlens arrays through which light emitted from the laser light source passes;

a moving mechanism that moves the plurality of microlens arrays without changing an optical length from the laser light source; and a Fourier lens through which light passing through the plurality of microlens arrays passes, wherein the plurality of microlens arrays and the Fourier lens constitute a Koehler illumination system, a microlens array is configured to rotate around an axis which is perpendicular to the microlens array, the moving mechanism causes the microlens array to rotate around the axis, and a plurality of lenses constituting the microlens array are arranged in a spiral shape.

2. The optical illumination device according to claim 1, wherein the plurality of microlens arrays include a first microlens array and a second microlens array which are disposed to face each other, and wherein a relative position between the first microlens array and the second microlens array is fixed.

3. The optical illumination device according to claim 2, the optical illumination device further comprising a connection portion that connects the first microlens array and the second microlens array to each other, wherein the first microlens array and the second microlens array are able to rotate integrally.

4. The optical illumination device according to claim 3, wherein the first microlens array and the second microlens array have a disc shape, and wherein the first microlens array and the second microlens array are able to rotate integrally around the same axis.

5. The optical illumination device according to claim 1, wherein the microlens array is disposed to be perpendicular to a direction of light which is emitted from the laser light source.

6. The optical illumination device according to claim 1, wherein the microlens array has a disc shape, and wherein the plurality of lenses are displaced from each other in position in a radial direction of the microlens array and are displaced from each other in position in a circumferential direction of the microlens array.

7. The optical illumination device according to claim 6, wherein an amount of displacement in the radial direction and an amount of displacement in the circumferential direction of neighboring lenses out of the plurality of lenses are fixed.

8. The optical illumination device according to claim 1, wherein the plurality of microlens arrays include a first microlens array and a second microlens array which are disposed to face each other, wherein the first microlens array includes a plurality of first lenses that are arranged in a spiral shape, and wherein the second microlens array includes a plurality of second lenses that are arranged in a spiral shape.

9. The optical illumination device according to claim 8, wherein the first microlens array and the second microlens array have a disc shape, wherein the plurality of first lenses are displaced from each other in position in a radial direction of the first microlens array and are displaced from each other in position in a circumferential direction of the first microlens array, and wherein the plurality of second lenses are displaced from each other in position in a radial direction of the second microlens array and are displaced from each other in position in a circumferential direction of the second microlens array.

10. The optical illumination device according to claim 8, wherein arrangement of the plurality of second lenses of the second microlens array when seen in a thickness direction thereof corresponds to arrangement of the plurality of first lenses in a one-to-one manner.

11. The optical illumination device according to claim 10, wherein a relative position between one lens out of the plurality of first lenses and one lens corresponding thereto out of the plurality of second lenses is fixed.

12. The optical illumination device according to claim 8, wherein the plurality of first lenses split the light emitted from the laser light source into a plurality of light beams, and wherein the plurality of second lenses condense the plurality of light beams output from the plurality of first lenses.

13. An optical illumination device comprising:

a laser light source;

one or more microlens arrays through which light emitted from the laser light source passes;

a moving mechanism that moves the microlens array without changing an optical length from the laser light source; and a Fourier lens through which light passing through the microlens array passes, wherein the microlens array rotates around an axis which is perpendicular to the microlens array, wherein the moving mechanism causes the microlens array to rotate around the axis, wherein the plurality of microlens arrays include a first microlens array and a second microlens array which are disposed to face each other, wherein the first microlens array includes a plurality of first lenses that are arranged in a spiral shape, wherein the second microlens array includes a plurality of second lenses that are arranged in a spiral shape, wherein the first microlens array and the second microlens array have a disc shape, wherein the plurality of first lenses are displaced from each other in position in a radial direction of the first microlens array and are displaced from each other in position in a circumferential direction of the first microlens array, wherein the plurality of second lenses are displaced from each other in position in a radial direction of the second microlens array and are displaced from each other in position in a circumferential direction of the second microlens array, and wherein an amount of displacement in the radial direction and an amount of displacement in the circumferential direction of neighboring lenses out of the plurality of first lenses and an amount of displacement in the radial direction and an amount of displacement in the circumferential direction of neighboring lenses out of the plurality of second lenses are the same.

14. An optical illumination device comprising:

a laser light source;

a first microlens array and second microlens array through which light emitted from the laser light source passes, the first microlens array and the second microlens array being disposed to face each other;

a moving mechanism that moves the first and second microlens arrays without changing an optical length from the laser light source; and a Fourier lens through which light passing through the first and second microlens arrays passes, wherein the moving mechanism causes the first and second microlens arrays to rotate around an axis perpendicular to the first and second microlens arrays, each of the first and second microlens arrays comprises a plurality of lenses that are arranged around the axis, and an outer diameter of each of the plurality of lenses is from 0.3 mm to 0.8 mm, and the light emitted from the laser light source passes the plurality of lenses which are arranged around the axis.

* * * * *